United States Patent
Ishizaki

(10) Patent No.: US 8,345,800 B2
(45) Date of Patent: Jan. 1, 2013

(54) RECEIVER APPARATUS AND RECEPTION METHOD

(75) Inventor: Haruya Ishizaki, Tokyo (JP)

(73) Assignee: NEC Corporation, Tokyo (JP)

( * ) Notice: Subject to any disclaimer, the term of this patent is extended or adjusted under 35 U.S.C. 154(b) by 396 days.

(21) Appl. No.: 12/679,131

(22) PCT Filed: Sep. 16, 2008

(86) PCT No.: PCT/JP2008/066631
§ 371 (c)(1),
(2), (4) Date: Mar. 19, 2010

(87) PCT Pub. No.: WO2009/038034
PCT Pub. Date: Mar. 26, 2009

(65) Prior Publication Data
US 2010/0246557 A1  Sep. 30, 2010

(30) Foreign Application Priority Data
Sep. 20, 2007  (JP) .................. 2007-243939

(51) Int. Cl.
*H03K 9/00* (2006.01)

(52) U.S. Cl. ........ 375/316; 375/260; 375/262; 375/267; 375/340; 375/343; 375/346

(58) Field of Classification Search ............ 375/316, 375/147, 150, 260, 262, 267, 340, 343; 370/203, 370/204, 205, 208, 209, 210
See application file for complete search history.

(56) References Cited

U.S. PATENT DOCUMENTS

| | | | | |
|---|---|---|---|---|
| 6,480,528 B1 * | 11/2002 | Patel et al. | ..................... | 375/148 |
| 8,085,838 B2 * | 12/2011 | Fifield | ........................... | 375/229 |
| 8,190,162 B2 * | 5/2012 | Hansen | ........................ | 455/442 |
| 2002/0054605 A1 * | 5/2002 | Aizawa | ........................ | 370/430 |
| 2008/0112508 A1 * | 5/2008 | Ishizaki et al. | ................ | 375/316 |

FOREIGN PATENT DOCUMENTS

| | | |
|---|---|---|
| JP | 2002-374181 A | 12/2002 |
| JP | 2003-522440 A | 7/2003 |
| WO | 2006/046632 A | 5/2006 |

OTHER PUBLICATIONS

International Search Report for PCT/JP2008/066631, mailed Nov. 25, 2008.

* cited by examiner

*Primary Examiner* — Dhaval Patel

(57) ABSTRACT

A receiver includes a sample and hold circuit that receives a signal (continuous time signal) that has been subject to frequency division multiplexing modulation, converts the signal to a discrete time signal, and outputs the discrete time signal, a discrete time filter that receives the signal output from the sample and hold circuit and attenuates a frequency component of a subcarrier different from a specified subcarrier, and a demodulation unit that extracts a digital baseband from a signal that has passed through the discrete time filter to complete a demodulation operation within one data symbol reception period.

12 Claims, 8 Drawing Sheets

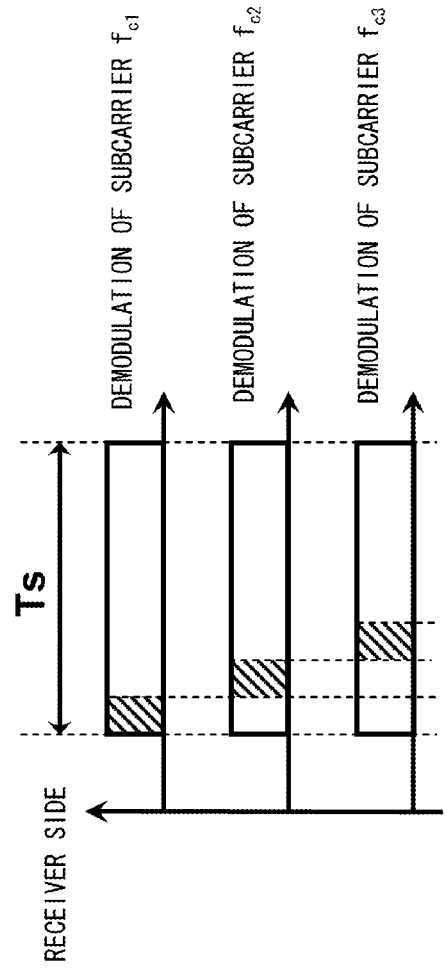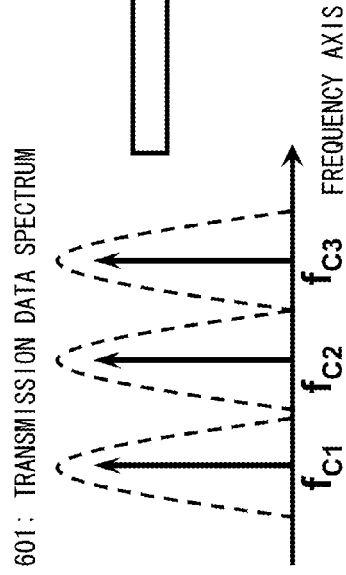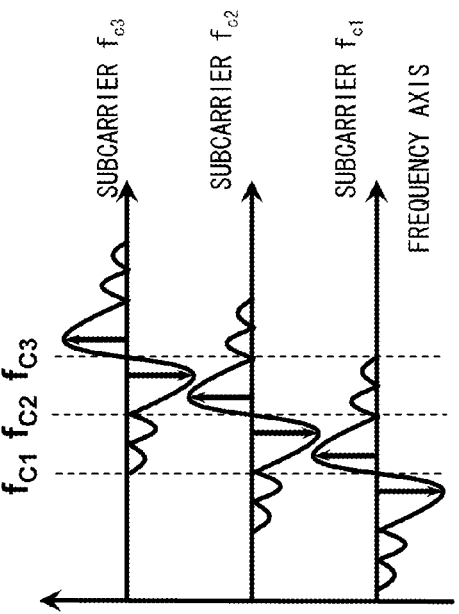

RECEIVER APPARATUS AND RECEPTION METHOD

This application is the National Phase of PCT/JP2008/066631, filed on Sep. 16, 2008, which is based upon and claims the benefit of the priority of Japanese patent application No. 2007-243939 filed on Sep. 20, 2007, the disclosure of which is incorporated herein in its entirety by reference thereto.

TECHNICAL FIELD

The present invention relates to a digital wireless receiver. More specifically, the invention relates to a receiver of a signal which has been subject to frequency division multiplexing and has been then transmitted.

BACKGROUND ART

The reduction of thermal noise and increase in operation speed that have been accomplished by the miniaturization of CMOS (Complementary MOS) technology have made it possible for a radio communication front-end circuit to be formed of CMOS. The radio communication front-end circuit has been hitherto formed of a compound semiconductor such as gallium arsenide, silicon germanium or the like, or silicon bipolar device.

In recent years, there has been proposed an RF circuit in which a radio front-end circuit including a low noise amplifier has been entirely formed of digital CMOS circuits, and a great advance has been made in digitalization of control and signal processing. This circuit utilizes a feature of the scaled-down CMOS such as ease of integration on a chip with a digital baseband.

Especially due to the development of a ubiquitous network represented by a sensor network, which uses a weak radio frequency band, demands for lower cost and lower power consumption for a wireless IP core have been more and more increased. Importance of an RF circuit technology which promotes formation of a circuit using digital CMOS and digitization of control and signal processing has been increased so as to meet these demands.

As shown in FIG. 1 of Patent Document 1 (JP Patent Kokai Publication No. 2002-374181), for example, in a digital radio receiver, a filter that uses discrete time signal processing is incorporated into a radio frequency region, and the number of expensive off-chip elements such as a surface elastic wave filter before or after a mixer is reduced. The digital radio receiver is manufactured by an existing CMOS integrated circuit fabrication technology. As a result, a radio receiver characterized by low cost and low power consumption is implemented.

As shown in Patent Document 2 (Pamphlet of International Publication No. WO 2006/046632), digitization of control and formation of a circuit using CMOS allow further lower power consumption. A configuration shown in Patent Document 2 will be described below with reference to drawings.

Referring to FIG. 2, it can be seen that the configuration in Patent Document 2 comprises a clock generator 209 that supplies a sampling clock, a carrier wave reproduction circuit 211 for reproducing a carrier wave, a sample and hold circuit 201, a band-pass filter 203, a demodulation circuit 205, and a stop circuit 204. The sample and hold circuit 201 samples an input signal upon reception of the sampling clock supplied through a sampling clock distribution system 212 from the clock generator 209, and then holds the input signal for a predetermined period of time, thereby converting the input signal into a discrete time signal. The band-pass filter 203 suppresses an unwanted aliased component and an undesired frequency component generated by digitization of the signal. The demodulation circuit 205 compares the input signal with the reproduced carrier wave for a very short time to output a baseband signal. The demodulation circuit 205 then sends the baseband signal to physical layer signal processing 210. The stop circuit 204 stops the operations of the demodulation circuit 205, sampling clock distribution system 212, and other amplifiers and filters that consume power of the receiver circuit as necessary upon reception of the demodulated baseband signal.

The sample and hold circuit 201 includes a sampling switch 200 that repeats an on/off operation according to the sampling clock and thereby samples the input signal for each predetermined time, and a sampling capacitor 202 that accumulates and holds the signal output from the sampling switch 200 for a predetermined time.

The stop circuit 204 includes a transmission quality determination means 206, a sampling time determination means 207, and a stop signal supply means 208. The transmission quality determination means 206 receives the baseband signal that has been demodulated and output by the demodulation circuit 205, calculates a demodulation error rate, and then determines whether this demodulation error rate satisfies a value as prescribed by communication standards. The sampling time determination means 207 determines a minimum demodulation time for satisfying the communication standards based on the demodulation error rate calculated by the transmission quality determination means 206. The stop signal supply means 208 supplies a signal that stops the demodulation circuit 205, sampling clock distribution system 212, and other amplifiers and circuit elements of the receiver, based on the demodulation time determined by the sampling time determination means 207.

The signal from the stop signal supply means 208 is supplied to the demodulation circuit 205, sampling clock distribution system 212, and the other amplifiers and filters. A demodulation function and a block such as the sampling clock distribution system that is a power consumption element in the receiver circuit are stopped as necessary.

FIG. 3 is a diagram showing operation waveforms of the circuit (demodulation circuit 205) in FIG. 2. FIG. 4 is a flowchart for explaining an operation of the circuit in FIG. 2. Referring to FIGS. 3 and 4, the operation of the circuit in FIG. 2 will be described in detail. For the sake of simplification, offset quadrature phase shift keying (O-QPSK) in which a baseband signal is band-limited to a sine wave will be herein taken by way of a simple example of digital modulation. In the case of typical quadrature phase shift keying, the phase of the carrier wave is moved in four types of phases of 45 degrees, 135 degrees, 225 degrees, and 315 degrees and digital data is transmitted with these types of phases being respectively associated to binary signals. No particular restriction is, however, imposed on data transition pattern. For this reason, three types of phase transition patterns including ±90 degrees phase shifts and 180 degree phase shift are used. In the case of the offset quadrature phase shift keying, however, the data transition of the 180-degree phase shift is not allowed and thus there remains two types of phase transition patterns comprised of ±90 degrees phase shifts. In addition, when the bandwidth of the baseband signal is limited to the sine wave, a speed at which the phase is moved by modulation is constant, and the envelope of a modulated wave is constant, thereby being simple.

Based on this simplicity of modulation, the phase shift of +90 degrees can be regarded as frequency modulation in which a frequency is super-imposed by a positive value from a carrier wave frequency. The same holds true for the reverse phase shift of −90 degrees.

That is, in the case of a modulation scheme in which a phase shift is made at a certain prescribed speed, it can be also regarded that the frequency modulation is performed from a waveform.

This modulation scheme is adopted in a physical layer of the 802.15.4 standards for Wireless Personal Area Networks, standardized by the Institute of Electrical and Electronics Engineers, inc., for example. A symbol rate is assumed to be Fr. These modulation conditions are assumed to be the same in the following description.

An input signal having a center frequency Fin, which has been frequency-selected and amplified through a radio frequency band selection filter and an amplifier not shown, is supplied to the sample and hold circuit 201.

The sampling switch 200 which is located in an initial stage of the sample and hold circuit 201, and which is driven by the sampling clock of a frequency fs supplied from the clock generator 209 to repeat on/off operation, samples a voltage amplitude value of the input signal for each sampling clock period 1/fs and sends this value to the sampling capacitor 202 in a succeeding stage. The value of the sampled input signal is held in this sampling capacitor 202 for the predetermined time during the sampling clock period 1/fs. The time during which this value of the sampled input signal is held is a value that can be changed according to the duty ratio of the sampling clock, the circuit configuration of the sample and hold circuit 201, and others.

As described above, the input signal is converted to a discrete time signal from a continuous time signal at the sample and hold circuit 201, and is supplied to the band-pass filter 203 and the demodulation circuit 205 located in succeeding stages. Digital signal data processing and circuit operation can be performed after the sample and hold circuit 201.

With the conversion to the discrete time signal, the signal output from this sample and hold circuit 201 includes a large number of frequency components other than the original input center frequency Fin.

As described in the description of the operation of the related art, the reason for this inclusion of the frequency components other than the original input center frequency Fin is that frequency components other than the desired frequency component may be reproduced from the sampled data because data values are made discrete. This phenomenon is generally referred to as "alias". The band-pass filter 203 in the succeeding stage is employed in order to eliminate aliases and undesired mixed frequency components from other communication standards.

When only a desired frequency component Fc is selected and extracted by the band-pass filter 203 from a large number of aliased components generated at the sample and hold circuit 201, the center frequency of a bandwidth can be converted from Fin to Fc while maintaining the digital baseband signal.

The sample and hold circuit 201 is combined with the band-pass filter 203, thereby performing frequency selection and conversion.

The discrete time signal output from the sample and hold circuit 201 is supplied to the band-pass filter 203 located at the stage succeeding to the sample and hold circuit 201. This band-pass filter 203 is composed by a digital filter that handles a discrete time signal. An infinite impulse response filter that returns (feedbacks) a signal output from the filter to an input of the filter and uses the fed-back signal for calculation, and a finite impulse response filter that does not feedback an output signal can be both used as the band-pass filter 203. The filter used herein selects and extracts only a signal band used in communication, outputs the extracted signal band, and supplies the extracted signal band to the demodulation circuit 205 in a succeeding stage. Therefore, the filter must be able to exclude signals from other communication standards and signals of neighboring channels of the same standard.

In view of this respect, it is required that the band-pass filter 203 can pass a signal of a narrow bandwidth and further have a high frequency cutoff characteristic. The reason for that requirement is that when a signal of a channel other than a desired channel is received during demodulation, the signal of the channel other than the desired channel cannot be separated due to the characteristics of the demodulation circuit 205, as will be described later, and interferes with a demodulating operation.

Generally, the infinite impulse response filter (IIR: Infinite Impulse Response Filter) satisfies the specifications using a low filter order ranging from fourth to sixth order. When the signal of the narrow bandwidth is selectively passed, filter poles come close. The filter may thereby become an unstable filter accompanied by a risk of oscillation.

On the other hand, the finite impulse response filter (FIR: Finite Impulse Response Filter) may have a filter length of approximately ten times that of the infinite impulse response filter having same characteristics, though there is no possibility of oscillation. Thus, a chip unit price may be increased.

The waveform of the modulated signal that has undergone frequency-conversion and selection is compared with the waveform of a reproduced carrier wave 213 that serves as a reference, in the demodulation circuit 205. The baseband signal is thereby extracted and demodulated.

Reproduction of the carrier wave will be herein described. Generally, in digital radio communication, data transmission is performed in packet format. It is stipulated that, before transmission of actual data, a fixed training signal which is referred to as a preamble is flown at the beginning portion of the packet for a fixed time.

In accordance with this preamble, the receiver circuit can prepare an environment necessary for actual data reception, such as frequency locking and phase synchronization by a frequency synthesizer. The receiver circuit can thereby perform demodulation.

This makes it possible to reproduce the carrier wave for a frequency used in the communication and then supply the carrier wave to the demodulation circuit 205 for demodulation, by utilizing the preamble. The sequence of operations mentioned above is performed by the carrier wave reproduction circuit 211.

The modulated signal, the frequency of which has been converted from Fin to Fc by the sample and hold circuit 201 and the band-pass filter 203 is supplied to the demodulation circuit 205, together with the carrier wave 213 reproduced by the carrier wave reproduction circuit 211. The baseband signal is thereby extracted and then demodulated.

FIG. 3 is a diagram showing operation waveforms of the demodulation circuit 205. As shown in FIG. 3, during 1/Fr where modulation is performed for one symbol, the demodulation circuit 205 is activated for just 1/Fc which corresponds to one period of the center frequency of the modulated signal, and the waveform corresponding to one wave portion of the modulated signal is read.

At a same time t, the waveform of the reproduced carrier wave 213 is also read. In this example, a case is considered where the phase of the reproduced carrier wave at the time t is zero and the phase of the received modulated signal is shifted to +90 degrees. As described in the description of the modulation scheme, it can be considered that when the phase shift of +90 degrees is made, frequency modulation of a particular positive value Δf alone is applied.

Based on this conception, if it is assumed that a sine wave which oscillates from a ground point 0 to a power supply voltage Vdd is supplied, and a reproduced carrier wave A(t) at the certain time t is expressed as:

$$A(t)=(Vdd/2)\{1+\sin(2\pi(Fct)\}$$

Then, a modulated wave A'(t), which has undergone a phase shift of +90 degrees is given by:

$$A'(t)=(Vdd/2)[1+\sin\{2\pi(Fc+\Delta f)t\}]$$

When the phase of the reproduced carrier wave A(t) at the time t is 0, the modulated wave A'(t) is expressed as follows, based on simple calculation of a sine wave:

$$A'(t)=(Vdd/2)[1+\sin\{2\pi(1+\Delta f/Fc)N\}]$$

where N is an integer.

When the waveform reading time t is close to a symbol start time 0 and an input frequency Fc is sufficiently faster than a change speed Δf of the baseband signal waveform, the following relation holds:

$$(Vdd/2)<A'(t)<Vdd$$

With a comparison circuit which determines whether the voltage amplitude of the modulated wave at time t is greater than or smaller than Vdd/2, it is possible to determine whether modulation of the phase shift of +90 degrees or modulation of the phase shift of −90 degrees is being performed. Demodulation can be thereby performed.

The phase at time t does not need to be 0. When the number of division from the ground point to the power supply voltage is increased as necessary to read the waveform using all of sample points between 0 and 1/Fc, waveform comparison can be made at any carrier wave phase, and demodulation can be thereby performed. The time t must be selected with sufficient delay from the symbol start point so that the inter-symbol interference by a multipath propagation delay may be avoided. As soon as the demodulation is completed, the demodulation circuit 205 is quickly stopped again.

The demodulated baseband signal is sent to the physical layer signal processing 210, and, at the same time is also sent to the transmission quality determination means 206.

The transmission quality determination means 206 finds the demodulation error rate and determines whether or not the demodulation error rate satisfies the prescribed value of the communication standard.

Generally, in the case of packet communication, before the transmission of actual data is performed, the preamble is transmitted and then a fixed training signal for determining a transmission state is sent within the packet. The fixed training signal can be utilized when finding the demodulation error.

When the demodulation error rate found by the transmission quality determination means 206 does not satisfy the prescribed value of the communication standard, the demodulation time is increased from 1/Fc to 2/Fc in the sampling time determination means 207. This 2/Fc is taken as the demodulation time for the next symbol.

According to the demodulation time for the next symbol that has thus been determined, the signal that stops the operations of the demodulation circuit 205, sampling clock distribution system 212, and the other amplifier and filter is supplied from the stop signal supply means 208. Then, the operations of the demodulation circuit 205 and other block functions are stopped for the next symbol.

The demodulation time is successively extended to 3/Fc, 4/Fc, and so on one by one, when the demodulation error rate does not satisfy the communication standard despite extension of the demodulation time to 2/Fc for the next symbol.

This operation allows the circuit stopping time to be adaptively changed according to the transmission quality. A flow of this operation will be shown in FIG. 4.

Next, the effect described in Patent Document 2 will be described. In this technology, the sampling clock is supplied to the sample and hold circuit 201 and power is supplied to the demodulation circuit 205 and the others for only a minimum time necessary for demodulation. Then, the operation of the receiver circuit is stopped for the remaining time. Thus, power consumption of the receiver circuit can be substantially reduced.

Consider a case where a modulated signal is supplied to the demodulation circuit at Fc=100 MHz in a standard in which the modulation time 1/Fr is prescribed to be 500 nanoseconds. In this case, if it is assumed that the time that is spent in detection of a phase modulated is 1/Fc=10 nanoseconds and each of a rise and fall of the circuit can be performed in one nanosecond. Then, power consumption of the demodulation circuit is [(10+1+1)/500]*100=2.4%, which is substantially lower than in a case where the circuit is operated continuously.

In the technology of Patent Document 1, for example, the circuit needs to be operated over an entire data symbol reception period.

On the other hand, in the technology in Patent Document 2, reduced power consumption can be achieved by adaptively stopping the circuit within a symbol period according to the transmission state or communication quality.

Patent Document 1:
JP Patent Kokai Publication No. JP-P2002-374181A
Patent Document 2:
International Publication No. WO2006/046632A1

SUMMARY

The entire disclosures of the above-mentioned Patent Documents 1 and 2 are incorporated herein by reference thereto. An analysis on the related technologies by the present inventor will be given below.

The related-art digital wireless reception technologies described above with reference to Patent Documents 1 and 2 have the following problems.

First, the digital RF technology in Patent Document 2 described above can accommodate reduced power consumption and lower cost. However, it is difficult for the digital RF technology in Patent Document 2 to handle a complicated modulated signal such as multi-ary data (m-ary data, where m>=2).

The reason for that difficulty is that, since demodulation is performed by reading the instantaneous time waveform of the modulated signal, it is difficult to instantaneously read the multi-ary data whose time waveform becomes complicated on a time axis.

Second, in the digital RF technology of Patent Document 1, a high data rate can be realized using multi-ary scheme. However, it is difficult to achieve reduced power consumption and lower cost.

The reason for that difficulty is as follows. When demodulation is performed, a modulated signal with a complicated time domain waveform of multi-ary data can be read using an analog-to-digital conversion circuit. As the number m of m-ary data is increased, however, an analog-to-digital converter (ADC) is required to have a high resolution and a fast sampling frequency. Further, when multi-valued data is used on a frequency axis, a digital signal processor (DSP) that performs a high-speed Fourier transform is required to decompose data into a spectrum. These requirements mean an increase in power and area overhead.

Each of the first and second problems does not impose a large constraint on an application such as a wireless LAN where communication of large-capacity multi-ary data is originally assumed and an application as in a cellular phone where complicated signal processing is required on a terminal chip side. Actually, a radio receiver circuit that uses these ADC and DSP is extensively used.

However, in an application such as sensor net communication, which severely requires low power operation and low cost, it is difficult to use these ADC and DSP with a large overhead. Consequently, the amount of data that can be handled is constrained.

On the other hand, as Bluetooth has been revised from the initial version of the standard which prescribes a maximum data rate of 721 kbps (effective value) to the EDR (Enhanced Data Rate) version which aims at 1 Mbps (effective value), a demand for large-capacity communication has actually increased also in the field of power-saving radio data communication in a weak radio frequency band, as in the wireless LAN and cellular phone.

Accordingly, it is an object of the present invention to provide a radio receiver apparatus capable of reducing chip area and power consumption of the radio receiver apparatus and a method therefore.

Another object of the present invention is to provide a digital radio receiver apparatus having a high data date with low power consumption and at low cost and a method therefore.

The invention disclosed in this application is generally configured as follows.

According to one aspect of the present invention, there is provided a receiver apparatus comprising:

a sampler circuit that samples a signal that has been subject to frequency division multiplexing modulation to convert the signal from a continuous time signal to a discrete time signal;

a discrete time filter that receives the discrete time signal output from the sampler circuit and attenuates one or more subcarrier frequency components different from a frequency component of a specified subcarrier; and a demodulation unit that extracts a digital baseband signal from a signal that has passed through the discrete time filter to complete a demodulation operation within one data symbol reception period. In the present invention, the different subcarrier frequency component includes at least a subcarrier adjacent to the specified subcarrier on a frequency axis.

In the present invention, after a frequency of one subcarrier has been passed and then the remainder of subcarrier frequency components has been attenuated by the discrete time filter, a baseband signal included in the one subcarrier may be read, thereby completing demodulation of the one subcarrier; and then, a sampling clock frequency may be switched, a frequency characteristic of the discrete time filter may be switched so that a frequency component of a subcarrier different from the frequency of the one subcarrier is passed and the remainder of subcarrier frequency components is attenuated, and then a baseband signal included in the different subcarrier may be read by the demodulation unit, thereby completing demodulation of the different subcarrier.

The receiver apparatus in the present invention may include:

a clock generator that supplies a clock signal in common to the sampler circuit, the discrete time filter, and the demodulation unit.

The discrete time filter in the present invention may comprise a moving average (Moving Average) filter of a predetermined order.

In the receiver apparatus according to another aspect of the present invention, a plurality of the sampler circuits may be disposed in parallel with respect to the input signal;

a plurality of the discrete time filters may be provided corresponding to the sampler circuits;

a plurality of the demodulation units may be provided corresponding to the discrete time filters;

a sampling clock of one frequency may be supplied in common to the sampler circuit, the discrete time filter, and the demodulation unit of one set; and the sampling clock of a frequency different from the one frequency may be supplied in common to the sampler circuit, the discrete time filter, and the demodulation unit of another set.

The receiver apparatus in the present invention may include a frequency hopping function of changing a frequency characteristic of the discrete time filter, and upon completion of demodulation of a baseband signal of one subcarrier by the demodulation unit, another subcarrier may be demodulated.

In the present invention, the hopping function and a frequency of a sampling clock may be adaptively changed for the sampler circuit, the discrete time filter, and the demodulation unit according to a transmission state.

The sampler circuit in the present invention comprises a sample and hold circuit including:

a switch that receives the continuous time signal that has been subject to frequency division multiplexing modulation and is controlled to be turned on or off according to an input value of the sampling clock; and a sampling capacitor with one end thereof connected to an output of the switch and the other end thereof connected to a reference potential.

According to the present invention, there is provided a signal processing apparatus including:

a sampler circuit that receives a signal that has been subject to frequency division multiplexing modulation as a continuous time signal and outputs a sampled value signal (discrete time signal) obtained by sampling the continuous time signal for a predetermined sampling period;

a discrete time filter that receives the sampled value signal and selectively passes a signal having a specified frequency component; and a processing circuit that receives the signal that has passed through the discrete time filter and performs predetermined signal processing on the signal;

after the signal processing on a signal of one frequency component has been completed by the processing circuit, a frequency characteristic of the discrete time filter being switched so that a specified frequency component of a signal different from the one frequency component is passed through the discrete time filter, and the processing circuit performing the signal processing on the signal of the different frequency component that has passed through the discrete time filter.

According to another aspect of the present invention, there is provided a method including the steps of:

receiving a signal that has been subject to frequency division multiplexing modulation as a continuous time signal and outputting a sampled value signal (discrete time signal) obtained by sampling the continuous time signal for a predetermined sampling period;

processing the discrete time signal by a discrete time filter and attenuating a subcarrier frequency component different from a signal of a specified subcarrier frequency component; and receiving a signal that has passed through the discrete time filter and performing demodulation processing on the signal; wherein after the demodulation of the signal of one carrier frequency component has been completed, a sampling clock frequency for the discrete time filter is switched, a frequency characteristic of the discrete time filter is switched so that a carrier frequency component different from the one carrier frequency component is passed through the discrete time filter, the remainder of carrier frequency components is attenuated, and the demodulation processing is performed on a signal of the different carrier frequency component that has passed through the discrete time filter.

According to a still another aspect of the present invention, there is provided a reception method including the steps of:

receiving a signal that has been subject to frequency division multiplexing modulation as a continuous time signal and outputting a sampled value signal (discrete time signal) obtained by sampling the continuous time signal for a predetermined sampling period;

processing the discrete time signal by a plurality of discrete time filters and passing through subcarrier frequency components respectively corresponding to the discrete time filters; and receiving signals that have passed through the discrete time filters and performing demodulation processing on the signals in parallel.

According to the present invention, reduction in chip area and power consumption of a receiver apparatus can be implemented.

The reason is as follows. In a related art radio receiver apparatus that has carried out large-capacity OFDM (Orthogonal Frequency Division Multiplex) communication of multi-ary data using large-area ADC and DSP, information of an excessive amount such as a spectrum is read in order to perform demodulation. This has become a factor of hampering use of the large-capacity OFDM communication in a weak radio frequency band. By limiting to the read-out of demodulated data, even for complex multi-ary data such as OFDM, waste of an excessive flow can be eliminated and large-capacity communication can be performed with power and area overhead reduced. Then, reduction in the chip area and power consumption can be thereby achieved.

The present invention can realize a radio receiver apparatus with a high data rate. The present invention allows a large-capacity OFDM communication technology characterized by low power and area saving in the weak radio frequency band, for example. Reception and transmission of data of an amount comparable to wireless LAN can be performed in a use of a sensor net as well. Further, the present invention allows completion of data reception and transmission in a short time. Thus, it is enough to achieve moderate Tx–Rx synchronization, which leads to cost reduction of the overall system.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 6A, 6B, and 6C are diagrams explaining a method of demodulating a frequency division multiplexing signal by a demodulator;

PREFERRED MODES

Exemplary embodiments of the present invention will be described. A digital radio receiver according to the present invention includes a sampler circuit (502), a demodulator (504), and a discrete time filter (503). The sampler circuit (502) receives and samples an FDM (Frequency Division Multiplexing) signal obtained by multiplexing a plurality of subcarriers f1, f2, . . . and fN on a frequency axis to perform sampling in order to increase the number of data per symbol with respect to a 2-ary (binary) modulation (BPSK, BFSK) using a single carrier wave that has been used in a weak radio frequency band. The demodulator (504) completes demodulation of a particular subcarrier f1 for the FDM signal within a short period of time (within one symbol data period), and then switches a frequency for the demodulator to a frequency for the different subcarrier f2, and completes demodulation of the subcarrier f2 within the short period of time, as in the case of the subcarrier f1. The discrete time filter (503) attenuates subcarriers $f_{M-1}$, $f_{M+1}$ adjacent to a particular subcarrier $f_M$ on the frequency axis to a clear level of desired demodulation quality because the subcarriers $f_{M-1}$, $f_{M+1}$ may be interference waves when the particular subcarrier $f_M$ is demodulated. The digital radio receiver further includes a clock generator (505) that allows completion of demodulation of the subcarrier $f_M$ within the short period of time, and further allows switching of a filter frequency characteristic in the same order of time as the short period of time. A detailed description will be given below in connection with examples.

Figure 1:
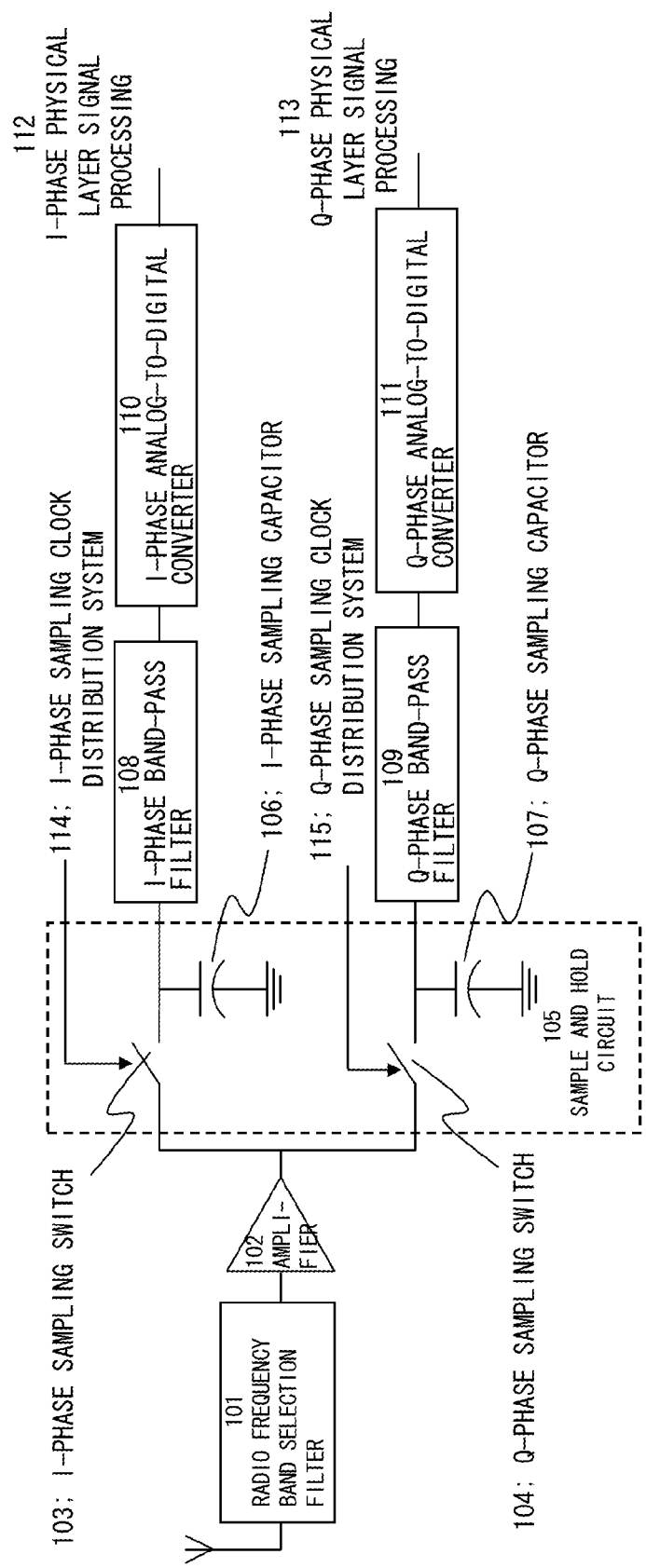
FIG. 1 is a block diagram showing a configuration of a related art digital wireless reception system in Patent Document 1.
Figure 2:
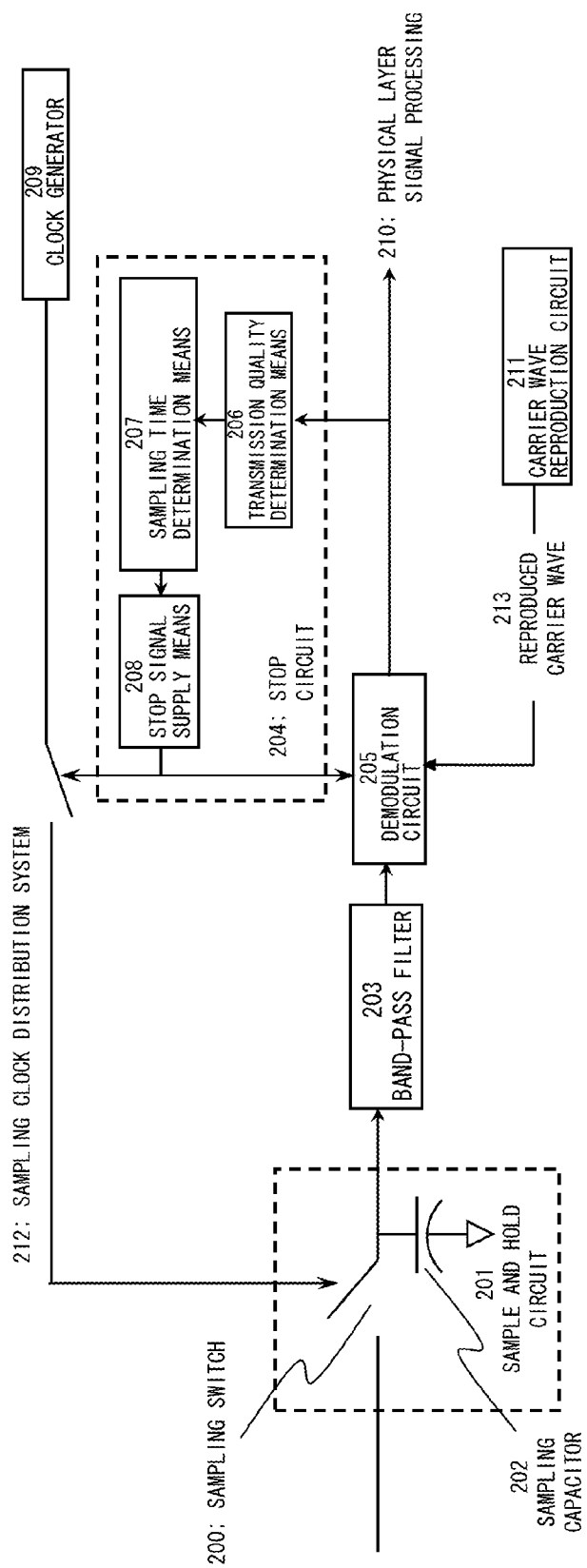
FIG. 2 is a block diagram showing a configuration of a related art digital wireless reception system in Patent Document 2.
Figure 3:
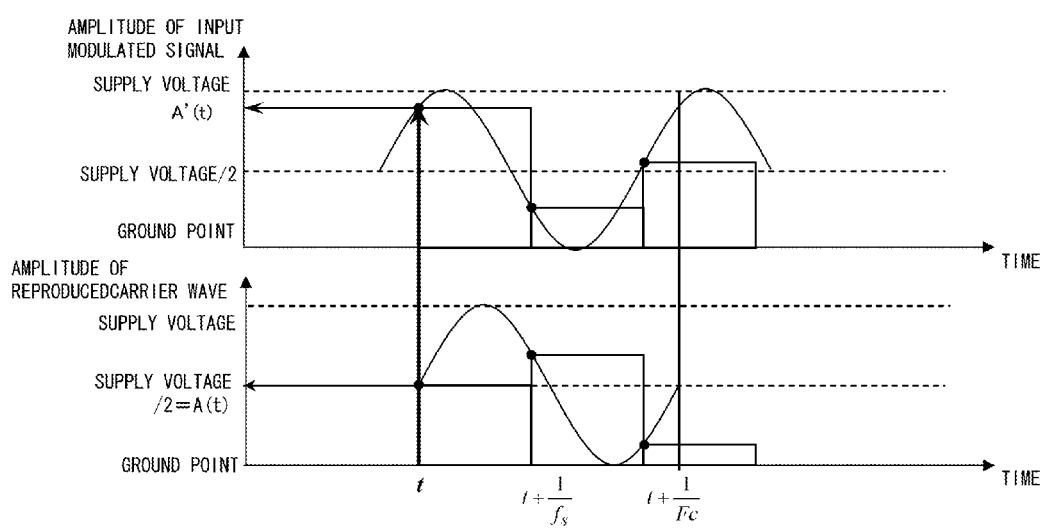
FIG. 3 is a timing diagram showing an operation of a demodulation circuit DEMOD in Patent Document 2.
Figure 4:
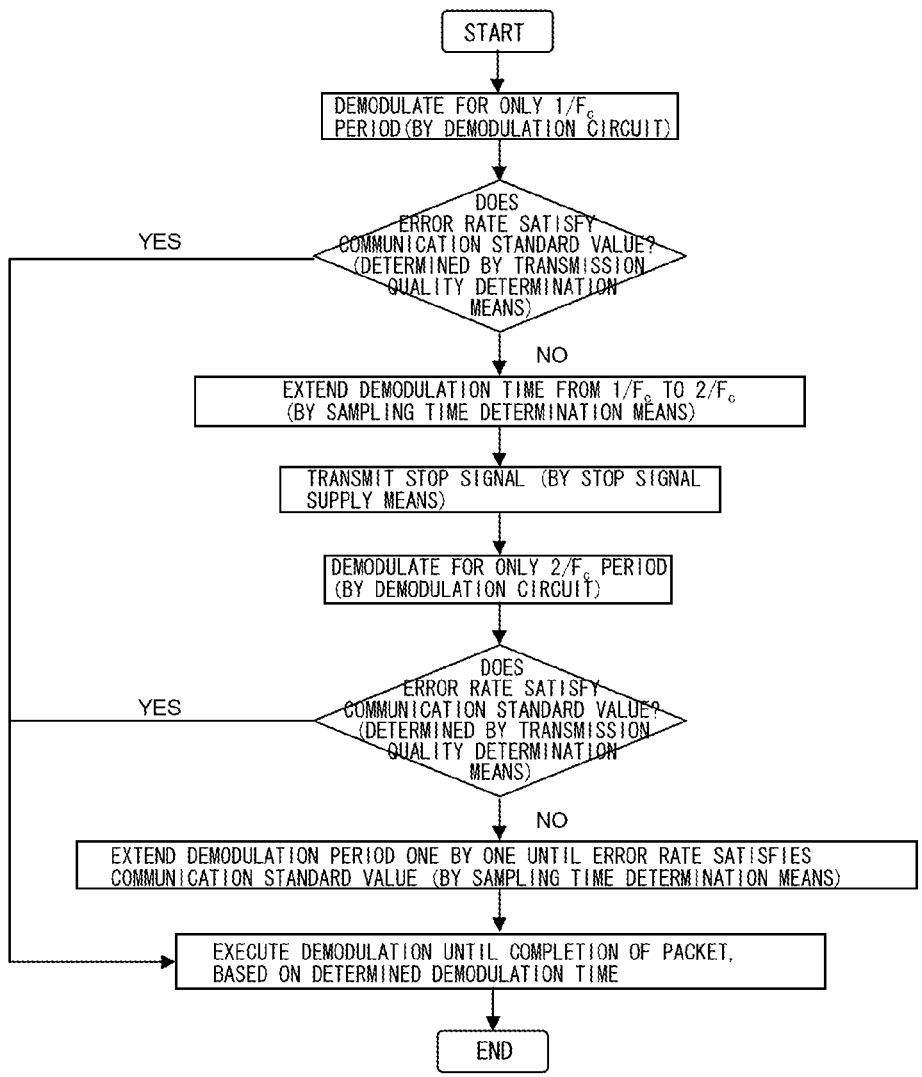
FIG. 4 is a flow diagram showing a procedure of determining demodulation time according to Patent Document 2.
Figure 5:
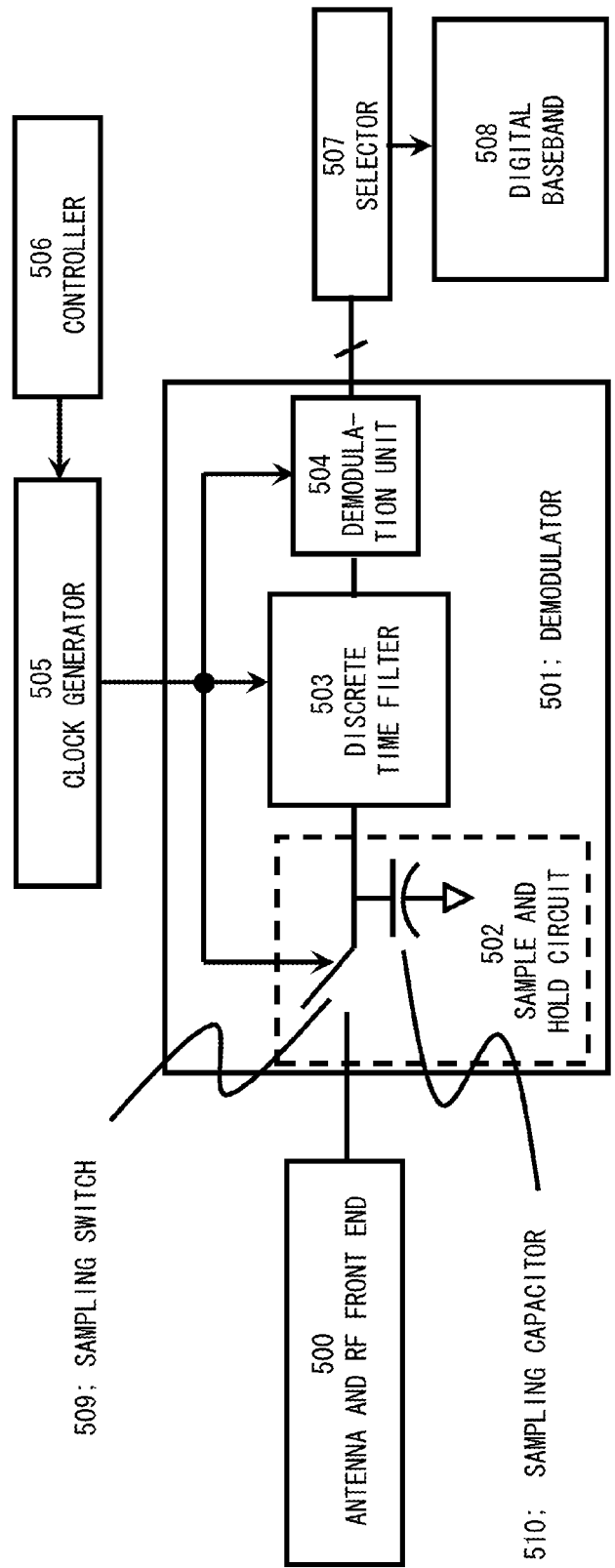
FIG. 5 is a diagram showing a configuration of a first exemplary embodiment of the present invention.

FIG. 5 is a block diagram showing a configuration of a digital radio receiver in a fist exemplary embodiment of the present invention. A received FDM signal that has been converted from a radio signal to an electrical signal through an antenna of an antenna and RF front end 500 is amplified, frequency-converted, and subject to filter processing by an RF front end of the antenna and RF front end 500. Then, the resulting signal is supplied to a demodulator 501, where the resulting signal is then demodulated.

The demodulator 501 in this exemplary embodiment includes a sample and hold circuit 502 that converts the modulated signal to a signal capable of being subject to discrete time processing, a discrete time filter 503 in which a timing relationship is defined by a sampling clock of a frequency fs supplied from the clock generator 505, and a demodulation unit 504 that receives an output signal of the discrete time filter 503 and performs demodulation.

The sample and hold circuit 502 includes a sampling switch 509 that repeats an on/off operation according to the sampling clock and samples the input signal for each predetermined time and a sampling capacitor 510 that accumulates and holds the signal output from the sampling switch 509 for a predetermined period of time.

The clock generator 505 generates the sampling clock necessary for the demodulation unit 504 and the discrete time filter 503 in the demodulator 501, and supplies the generated clock to the demodulator 501.

A frequency and a phase relationship of the signal to be generated by the clock generator 505 is defined by a digital control signal supplied from a controller 506.

Signals that have been demodulated by the demodulator 501 and then output are serialized by a selector 507, and is then sent to a digital baseband block 508.

As an operation and effect of this exemplary embodiment, the demodulation unit that has been formed of an ADC and a DSP having a high resolution and a fast sampling rate can be formed of at least a one-bit quantizer.

Figure 7:
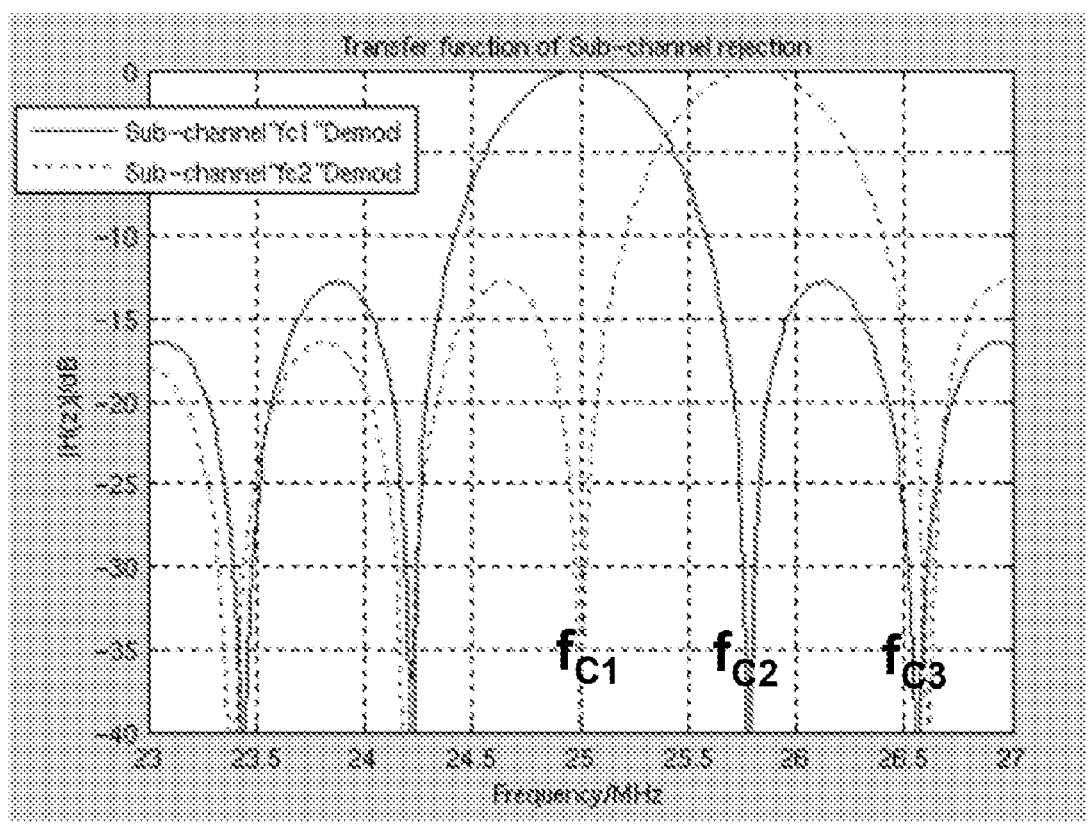
FIG. 7 is a diagram showing frequency characteristics of a discrete time filter.

FIGS. 6A, 6B and 6C are diagrams for explaining a demodulation method of the demodulator 501 in FIG. 5. FIG. 6A shows a frequency domain spectrum of FDM transmission data. FIG. 6B shows time multiplexed demodulation processing (indicated by hatching) of respective subcarriers $f_{c1}$, $f_{c2}$ and $f_{c3}$ in time axis. FIG. 6C shows time domain waveforms of respective subcarriers $f_{c1}$, $f_{c2}$ and $f_{c3}$. FIG. 7 is a diagram showing frequency characteristics of the discrete time filter 503. An operation of the digital radio receiver in this exemplary embodiment will be described in detail.

In this exemplary embodiment, in order to increase the number of data per symbol with respect to 2-ary modulation (represented by BFSK (Binary Phase Shift Keying)) using a single carrier that has been mainly used in a weak radio frequency band, an FDM signal with multi-ary data obtained by frequency division multiplexing is employed.

A spectrum of the FDM signal is shown in a transmission data spectrum 601 in FIG. 6A. Herein, three subcarriers $f_{c1}$ to $f_{c3}$ are employed, and each of the three subcarriers has undergone phase modulation.

Accordingly, when BPSK modulation is applied within a data symbol period Ts, using the subcarrier $f_{c1}$, a data rate for each subcarrier becomes (1/Ts). Thus, 3×(1/Ts) data of the transmission data spectrum 601 is sent.

Referring to FIG. 6A, only the three carrier waves are multiplexed, for convenience of description. The present invention, however, is not of course limited to such a configuration.

The FDM signal that has been converted to the electrical signal through the antenna is amplified, frequency-converted, and subject to filter processing by the RF front end of the antenna and RF front end 500. The FDM signal is amplified and frequency-converted as necessary so that the signal is held in an input range or a frequency band to the demodulator 501 while reducing a signal-to-noise deterioration and a waveform distortion to meet desired demodulation specifications. The FDM signal that has been amplified and then frequency-converted is converted to a discrete time signal by the sample and hold circuit 502 of the demodulator 501 according to the sampling clock so that the discrete time processing by the filter or the like is allowed.

The FDM signal, which has been supplied to the sample and hold circuit 502 and converted to a discrete time signal, is subject to band-pass filtering by the discrete time filter 503. The band-pass filtering has a characteristic of passing $f_{c1}$ and attenuating $f_{c2}$ and $f_{c3}$.

The reason why the discrete time filter is used instead of an analog filter in this exemplary embodiment is as follows. As will be described later, it is necessary to switch a frequency characteristic of the filter at high speed in an order of time within the data symbol period. In the case of the discrete time filter, by changing the sampling clock by digital control, switching of the characteristic of the filter at high speed can be readily performed. Thus, the discrete time filter is used instead of the analog filter.

The filter should locally attenuate predetermined bands such as $f_{c2}$ and $f_{c3}$ rather than eliminating white noise. Thus, the filter does not need to have a steep cutoff characteristic, which might be required in channel selection customarily performed using a SAW (surface Acoustic Wave) filter in radio communication.

When the discrete time filter 503 is used, such a local attenuation characteristic can be generated by the digital control.

On the other hand, different from the discrete time filter 503, the analog filter is made to have a frequency characteristic by combining a passive element with a large-area transistor which have been fabricated on-chip. Thus, it is difficult to switch the frequency characteristic at high speed and to give a local attenuation characteristic.

FIG. 7 shows an example of frequency characteristics of the discrete time filter 503. This filter implements a low-pass characteristic by calculating a moving average of eight sampling points. A relationship between an output signal (discrete time signal) OUT and an input signal (discrete time signal) IN of an N-order moving average filter is given by:

$$OUT(n)=(1/N)*\{IN(n)+IN(n-1)+\ldots IN(n-N)\} \quad (1)$$

Then, a transfer function H(z) is given by Expression (2) (in a case of eighth order, N=8):

$$H(z) = (1/N)*[1+z^{-1}+z^{-2}+\ldots+z^{-(N-1)}] \quad (2)$$
$$= (1/N)(1-z^{-N})/(1-z^{-1})$$

A frequency response is given as follows when z=exp(j*ω) (where ω=2πf):

$$H(e^{j\omega})=(1/N)\sin\{N(\omega/2)\}\exp\{-j\,\omega(N-1)/2\}/\{\sin(\omega/2)\} \quad (3)$$

It can be seen from Expression (3) that when N is set to 8, the discrete time filter 503 has zero points, where a gain becomes 0, at ω=2π/N, 4π/N, ... and so on. In case of N=8, a zero point is present at ω=π/4, that is, at f=fs/8 in frequency (where fs is a frequency of the sampling clock).

When an adjacent subcarrier is disposed at this zero point, $f_{c2}$ and $f_{c3}$ other than the subcarrier $f_{c1}$ that is demodulated by the demodulation unit 504 in the succeeding stage of the discrete time filter 503 are strongly attenuated, thereby not influencing demodulation quality. Thus, it is a key point to dispose a subcarrier other than a desired subcarrier at a zero point.

After the subcarrier other than the desired subcarrier $f_{c1}$ has been attenuated by the discrete time filter 503, a baseband signal included in $f_{c1}$ is read from the waveform instantaneous value of $f_{c1}$ at the demodulation unit 504. Demodulation of $f_{c1}$ is thereby completed.

Upon completion of demodulation of $f_{c1}$ (see $f_{c1}$ in FIGS. 6B and 6C), the sampling clock frequency $f_s$ to be supplied to the demodulator 501 from the clock generator 505 is switched. Then, demodulation of $f_{c2}$ is started (see $f_{c2}$ FIGS. 6B and 6C). By switching the sampling clock frequency, the characteristic of the discrete time filter 503 is shifted from a solid line potion to a dotted portion in FIG. 7. Then, the filter becomes the one which passes $f_{c2}$ and strongly attenuates $f_{c1}$ and $f_{c3}$.

Thereafter, a baseband signal included in $f_{c2}$ is read from the waveform instantaneous value of $f_{c2}$, as at a time of demodulation of $f_{c1}$. Then, the sampling clock frequency fs is switched, thereby starting demodulation of $f_{c3}$.

Frequency hopping at high speed used in the present invention has been performed in spread spectrum communication such as UWB (Ultra-Wide-Band, ultra wide band communication). In that case, it is required that frequency switching be performed at high speed so that a gain at a front end unit may be held in an input dynamic range in a succeeding stage, following the hopping. When frequency hopping is performed for such spread spectrum communication, however, it is enough to set gain convergence to a constant level or less for each hopping slot. A demodulation unit that is placed after gain control should receive a signal having a constant frequency and strength to perform demodulation. Thus, the frequency hopping is essentially different from the technology of the present invention.

Next, an effect of this exemplary embodiment will be described. By performing the above-mentioned operations, demodulation of the FDM signal multiplexed with $f_{c1}$ to $f_{c3}$ can be all completed by a single demodulation circuit without using the ADC necessary for the related-art FDM demodulation technique and the DSP that performs a high-speed Fourier transform.

Further, when the baseband signal is just read from the waveform instantaneous value, one-bit quantizer alone can be used for the reading. It can be seen from these advantages that power consumption and the chip area can be greatly reduced.

Figure 8:
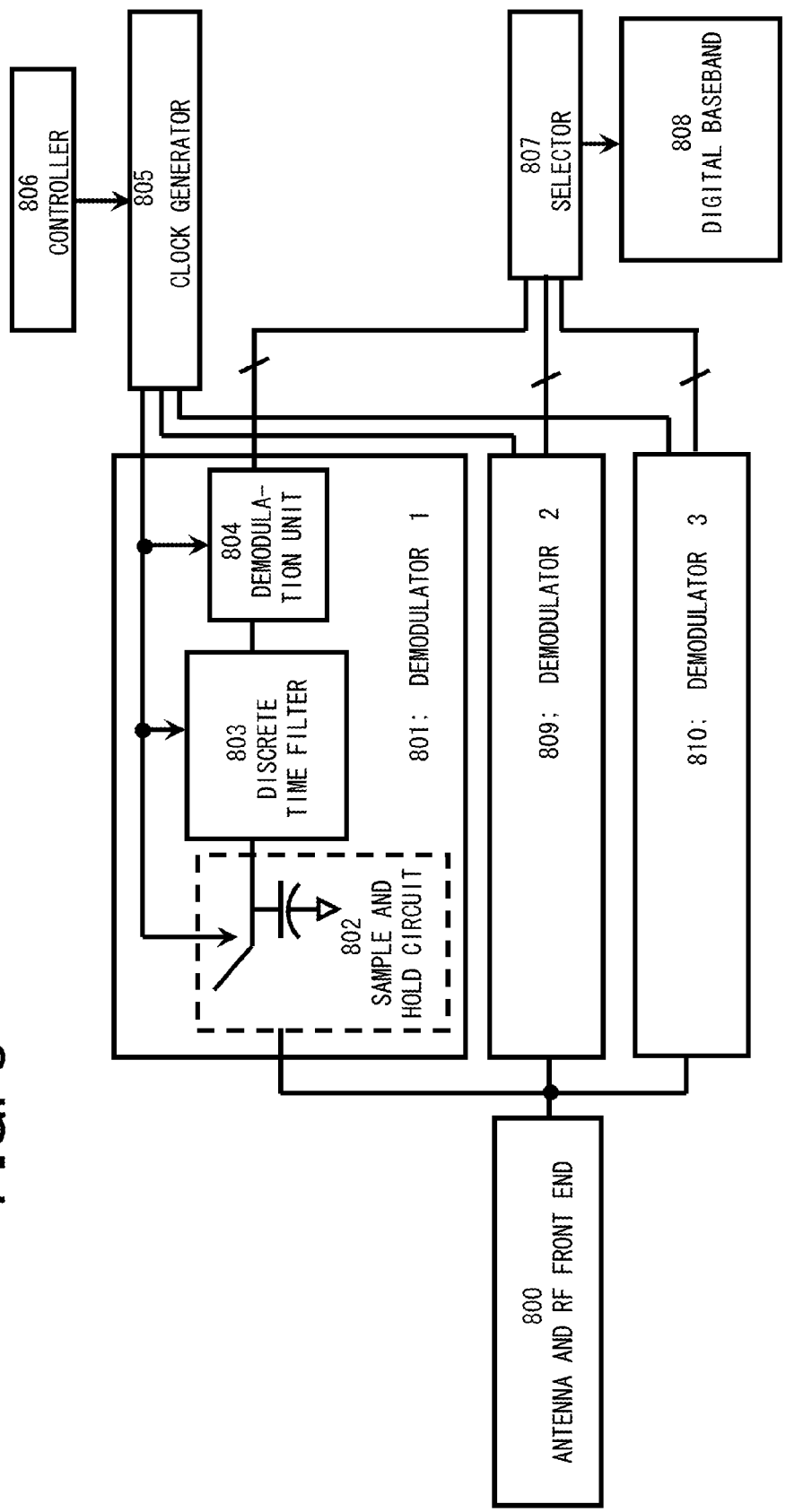
FIG. 8 is a diagram showing a configuration of a second exemplary embodiment of the present invention.

Next, a second exemplary embodiment of the present invention will be described. FIG. 8 is a block diagram showing the second exemplary embodiment of the present invention. Only configurations different from those of the first exemplary embodiment will be described. The second exemplary embodiment is different from the first exemplary embodiment in that a first demodulator (801), a second demodulator (809), and a third demodulator (810) of a same configuration are disposed in parallel, and that a sampling clock is supplied to each demodulator from a clock generator 805.

The first demodulator (801) includes a discrete time filter (803) that passes only a subcarrier $f_{c1}$ for an FDM signal and attenuates $f_{c2}$ and $f_{c3}$.

The second demodulator (809) includes a discrete time filter that passes only the subcarrier $f_{c2}$ for the FDM signal and attenuates $f_{c1}$ and $f_{c3}$.

The third demodulator (810) includes a discrete time filter that passes only the subcarrier $f_{c3}$ for the FDM signal and attenuates $f_{c1}$ and $f_{c2}$.

An operation of the second exemplary embodiment of the present invention will be described. In the following description, only an operation different from that in the first exemplary embodiment will be described.

The FDM signal that has been amplified and subject to filter processing as necessary by an antenna and RF front end 800 is supplied to the first demodulator (801), second demodulator (809) and third demodulator (810) at the same time. The subcarriers $f_{c1}$, $f_{c2}$, and $f_{c3}$ are respectively demodulated by the demodulators 801, 809, and 810, according to the sampling clock from the clock generator 805. Demodulated outputs from the demodulators 801, 809, and 810 are supplied to a selector 807 to be selected. A selected one of the outputs is output as a digital baseband signal 808.

In this exemplary embodiment, the subcarriers $f_{c1}$ and $f_{c2}$ by the demodulators 801 and 809, for example, can be simultaneously demodulated at the same time. In the first exemplary embodiment, only one demodulator is provided. Thus, two or more subcarriers cannot be simultaneously demodulated.

Next, an effect of this exemplary embodiment will be described. Since the demodulator is provided for each subcarrier, the time taken for demodulation of one subcarrier can be increased. When the number of subcarriers is three in the first exemplary embodiment, the time taken for demodulation of one subcarrier is limited to one third of the data symbol period Ts at the maximum.

This means that energy held by one bit of data to be received and transmitted is also limited to one third. A demodulation bit error rate is thereby deteriorated.

In this exemplary embodiment, energy held by one bit of data is increased more than in the first exemplary embodiment, though power consumption and the area are increased corresponding to the increase in the number of the demodulators.

For this reason, the second exemplary embodiment becomes effective in an environment where reception sensitivity cannot be ensured by the first exemplary embodiment and power consumption and the area are to be reduced more than a related art system in which the ADC and the DSP are used.

Disclosures of Patent Documents listed above are incorporated herein by reference. Modifications and adjustments of the exemplary embodiment and the examples are possible within the scope of the overall disclosure (including claims) of the present invention, and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

The invention claimed is:

1. A receiver apparatus comprising:
a sampler circuit that samples a signal that has been subject to frequency division multiplexing modulation to convert the signal from a continuous time signal to a discrete time signal;
a discrete time filter that receives the discrete time signal output from the sampler circuit and attenuates one or more subcarrier frequency components different from a frequency component of a specified subcarrier; and
a demodulation unit that extracts a digital baseband signal from a signal that has passed through the discrete time filter, the demodulation unit completing a demodulation operation within one data symbol reception period, and
wherein after a frequency of one subcarrier has been passed and then the remainder of subcarrier frequency components have been attenuated by the discrete time filter, a baseband signal included in the one subcarrier is read to complete demodulation of the one subcarrier, and then, a sampling clock frequency is switched, a frequency characteristic of the discrete time filter is switched so that a frequency component of a subcarrier different from the frequency of the one subcarrier is passed and the remainder of subcarrier frequency components is attenuated and then a baseband signal included in the different subcarrier is read by the demodulation unit to complete demodulation of the different subcarrier.

2. The receiver apparatus according to claim 1, wherein the different subcarrier frequency component includes at least a subcarrier adjacent to the specified subcarrier on a frequency axis.

3. The receiver apparatus according to claim 1, including a clock generator that supplies a clock signal in common to the sampler circuit, the discrete time filter, and the demodulation unit.

4. The receiver apparatus according to claim 1, wherein the discrete time filter comprises a moving average filter of a predetermined order.

5. The receiver apparatus according to claim 1, comprising:
a plurality of the sampler circuits which are disposed in parallel with respect to an input signal;
a plurality of the discrete time filters which are provided corresponding to the sampler circuits; and
a plurality of the demodulation units which are provided corresponding to the discrete time filters;
a sampling clock of one frequency being supplied in common to the sampler circuit, the discrete time filter, and the demodulation unit of one set, while the sampling clock of a frequency different from the one frequency being supplied in common to the sampler circuit, the discrete time filter, and the demodulation unit of another set.

6. The receiver apparatus according to claim 1, including a frequency hopping function that changes a frequency characteristic of the discrete time filter, wherein upon completion of demodulation of a baseband signal of one subcarrier by the demodulation unit, another subcarrier may be demodulated.

7. The receiver apparatus according to claim 6, wherein the hopping function and a frequency of a sampling clock are adaptively changed for the sampler circuit, the discrete time filter, and the demodulation unit according to a transmission state.

8. The receiver apparatus according to claim 1, wherein the sampler circuit comprises a sample and hold circuit including:
a switch that receives the continuous time signal that has been subject to frequency division multiplexing modulation and is controlled to be turned on and off according to an input value of the sampling clock; and
a sampling capacitor that accumulates and holds the signal output from the switch for a predetermined period of time.

9. A frequency division multiplexing radio transmission system comprising the receiver apparatus as set forth in claim 1.

10. A reception method comprising:
receiving a signal that has been subject to frequency division multiplexing modulation as a continuous time signal and outputting a discrete time signal obtained by sampling the continuous time signal for a predetermined sampling period;
processing the discrete time signal by a discrete time filter to attenuate one or more subcarrier frequency components different from a signal of a specified subcarrier frequency component;
receiving a signal that has passed through the discrete time filter and performing demodulation processing on the signal; and
after the demodulation of the signal of one carrier frequency component has been completed, switching a sampling clock frequency for the discrete time filter and switching a frequency characteristic of the discrete time filter so that a carrier frequency component different from the one carrier frequency component is passed through the discrete time filter, the remainder of carrier frequency components is attenuated; and
performing demodulation processing on a signal of the different carrier frequency component that has passed through the discrete time filter.

11. The method according to claim 10, comprising:
processing the discrete time signal by a plurality of discrete time filters and passing through subcarrier frequency components respectively corresponding to the a plurality of discrete time filters; and
receiving signals that have passed through the a plurality of discrete time filters and performing demodulation processing on the signals in parallel.

12. A receiver apparatus comprising:
a sampler circuit that samples a signal that has been subject to frequency division multiplexing modulation to convert the signal from a continuous time signal to a discrete time signal;
a discrete time filter that receives the discrete time signal output from the sampler circuit and attenuates one or more subcarrier frequency components different from a frequency component of a specified subcarrier; and
a demodulation unit that extracts a digital baseband signal from a signal that has passed through the discrete time filter, the demodulation unit completing a demodulation operation within one data symbol reception period; and
wherein:
the sampler circuit receives and samples an FDM (Frequency Division Multiplexing) signal of multi-ary data, multiplexed with a plurality of subcarriers on a frequency axis;
the demodulation unit completes demodulation of one of the subcarriers for the FDM signal within one symbol data period, and then performs switching to a different subcarrier to complete demodulation of the different t subcarrier within the one symbol data period; and
the discrete time filter receives the signal sampled by the sampler circuit and attenuates a different subcarrier adjacent to one subcarrier on a frequency axis to a predetermined level when the one subcarrier is demodulated to output the resulting signal to the demodulation unit; and wherein
the receiver apparatus further comprises
a clock generator that supplies a clock signal in common to the sampler, the discrete time filter and the demodulation unit so that demodulation of the one subcarrier is completed within the one symbol data period and switching of a frequency characteristic of the discrete time filter is made in a same order of time as the one symbol data period.

* * * * *